United States Patent [19]
Tanaka et al.

[11] Patent Number: 5,157,520
[45] Date of Patent: Oct. 20, 1992

[54] DEVICE FOR TRANSPORTING DOCUMENTS

[75] Inventors: Hironori Tanaka, Yamatokoriyama; Matahira Kotani; Masafumi Matsumoto, both of Nara, all of Japan

[73] Assignee: Sharp Kabushiki Kaisha, Osaka, Japan

[21] Appl. No.: 250,267

[22] Filed: Sep. 28, 1988

[30] Foreign Application Priority Data

Sep. 30, 1987 [JP] Japan .................. 62-150650[U]

[51] Int. Cl.$^5$ .............................................. H04N 1/12
[52] U.S. Cl. .................................. 358/498; 358/496; 355/75
[58] Field of Search ............... 358/256, 257, 280, 400, 358/434, 443, 496, 498, 296; 355/48, 49, 50, 51, 75

[56] References Cited

U.S. PATENT DOCUMENTS

| | | | |
|---|---|---|---|
| 4,174,904 | 11/1979 | Murasaki et al. | 355/51 |
| 4,269,502 | 5/1981 | Tsuda et al. | 355/51 |
| 4,300,169 | 11/1981 | Sato | 358/256 |
| 4,621,802 | 11/1986 | Ishida . | |
| 4,739,376 | 4/1988 | Kaneko1 | 355/50 |

FOREIGN PATENT DOCUMENTS

| | | |
|---|---|---|
| 3611850 | 10/1986 | Fed. Rep. of Germany . |
| 3608068 | 9/1987 | Fed. Rep. of Germany . |
| 0159056 | 9/1983 | Japan ................... 358/256 |

Primary Examiner—James J. Groody
Assistant Examiner—Kim Yen Vu

[57] ABSTRACT

A device for transporting documents includes a document transport path having a position for optically reading the document, a first pair of a transport roller and pinch a roller disposed in the transport path upstream from the reading position, and a second pair of a transport roller and a pinch roller disposed in the transport path downstream from the reading position, the transport path being defined by an upper guide plate and a lower guide plate, the transport path having two document contact portions provided respectively between the reading position and the first pair of rollers and between the reading position and the second pair of rollers for slidingly contacting the document during transport, the two document contact portions being formed by bending at least one of the upper and lower guide plates at an angle into the document transport path opposite a flat section of the opposing guide plate.

3 Claims, 2 Drawing Sheets

DEVICE FOR TRANSPORTING DOCUMENTS

BACKGROUND OF THE INVENTION

1. Field of the Invention

The present invention relates to a document transport device for use in a facsimile apparatus, copying machine or the like having an optical reading assembly, and more particularly to a device for transporting at a specified speed a document having data recorded thereon for the reading assembly to read the data during transport.

2. Description of the Prior Art

Such document transport devices heretofore generally used have the construction shown in FIG. 2. The illustrated document transport device S has a transport path 3 defined by a lower guide plate 1 and an upper guide plate 2 opposed to the plate 1 and spaced apart therefrom by a predetermined clearance for transporting a document 4 through the clearance. The transport path 3 is provided with a first transport roller 5, a first pinch roller 6 for pressing the document 4 against the roller 5, a second pinch roller 7 and a second transport roller 8 for pressing the document 4 against the roller 7. These rollers are arranged toward the direction of transport of the document 4 in the order mentioned. Between the first transport roller 5 and the second pinch roller 7, the lower guide plate 1 is formed with an aperture 9 for passing light therethrough to provide a position for optically reading the document. The transport device S has an optical reading assembly which comprises a light source 10 for projecting light on the document 4 at the apertured reading position 9, reflecting mirrors 11, 12, 13 for deflecting the light projected by the light source 10 and reflected from the document 4, a lens 14 for collimating the deflected light, and a reading device 15, such as a charge-coupled device (CCD), for receiving the collimated light to read the data recorded on the document 4.

To enable the reading assembly to read the data accurately, the document 4 must be transported and tensioned at least when the document 4 passes the apertured reading position 9. For this purpose, the second pinch roller 7 disposed downstream from the apertured reading position 9 with respect to the transport direction is rotated at a higher speed than the first transport roller 5 upstream from the apertured reading position 9, with the first pinch roller 6 adapted to exert a higher pressure than the second transport roller 8, so as to transport the document 4 at a constant speed corresponding to the speed of rotation of the first transport roller 5, while causing the second pinch roller 7, higher than the first transport roller 5 in rotational speed, to tension the document 4 between the two rollers 5 and 7.

However, in the case where the document 4 is tensioned between the two rollers 5, 7 by rotating these rollers 5, 7 at different speeds and pressing the two rollers 6, 8 against the rollers 5, 7, respectively, at different pressures, the vibration of the motor (not shown) for driving the rollers 5, 7 is transmitted to these rollers 5, 7, invariably deflecting the document 4 at the portion thereof opposed to the apertured reading position 9 between the rollers 5, 7. Consequently, the reading assembly is unable to accurately read the data on the document 4. For example, when the document 4 bears a longitudinal straight line, there arises the problem that the line is read as a nonlinear zigzag image.

SUMMARY OF THE INVENTION

The present invention provides a device for transporting documents which comprises a document transport path having a position for optically reading the document while the document is being transported through the paper transport path, a first pair of a transport roller and a pinch roller therefor disposed in the transport path upstream from the reading position with respect to the direction of transport of the document, and a second pair of a transport roller and a pinch roller therefor disposed in the transport path downstream from the reading position with respect to the transport direction, the transport path being defined by an upper guide plate and a lower guide plate spaced apart by a predetermined clearance, the transport path having two document contact portions provided respectively between the reading position and the first pair of rollers and between the reading position and the second pair of rollers to come into sliding contact with the document during transport, the two document contact portions being formed by bending at least one of the upper and lower guide plates.

Thus, the present device has two document contact portions which are formed by bending the upper guide plate and/or lower guide plate at specific portions thereof, whereby the vibration of the transport rollers is prevented from being transmitted to the document to assure accurate reading of the document data at the apertured reading position.

The two document contact portions are disposed between the apertured reading position and the first pair of rollers, and between the apertured reading position and the second pair of rollers, respectively. Preferably, the upper guide plate has one of the two document contact portions, and the lower guide plate has the other document contact portion. More preferably, the upper guide plate has one of the document contact portions between the apertured reading position and the first pair of rollers, and the lower guide plate has the other document contact portion between the apertured reading position and the second pair of rollers.

The document contact portions are formed by bending the upper guide plate and/or the lower guide plate preferably at an angle of 5 to 20 degrees.

DESCRIPTION OF THE PREFERRED EMBODIMENT

The preferred embodiment of the invention will be described below in detail with reference to FIG. 1.

Figure 1:
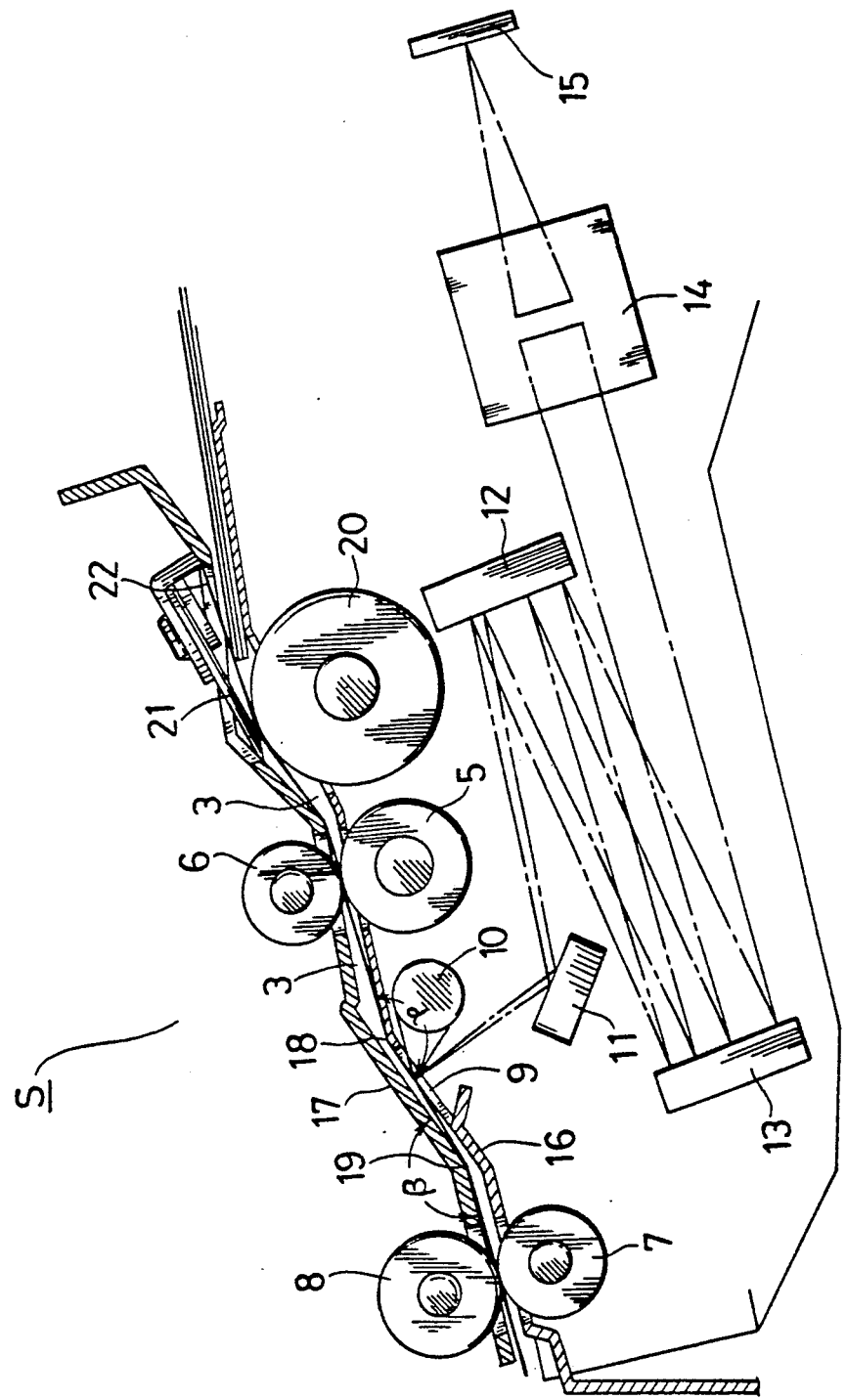
FIG. 1 is a view in vertical section showing a document transport device embodying the present invention.
Figure 2:
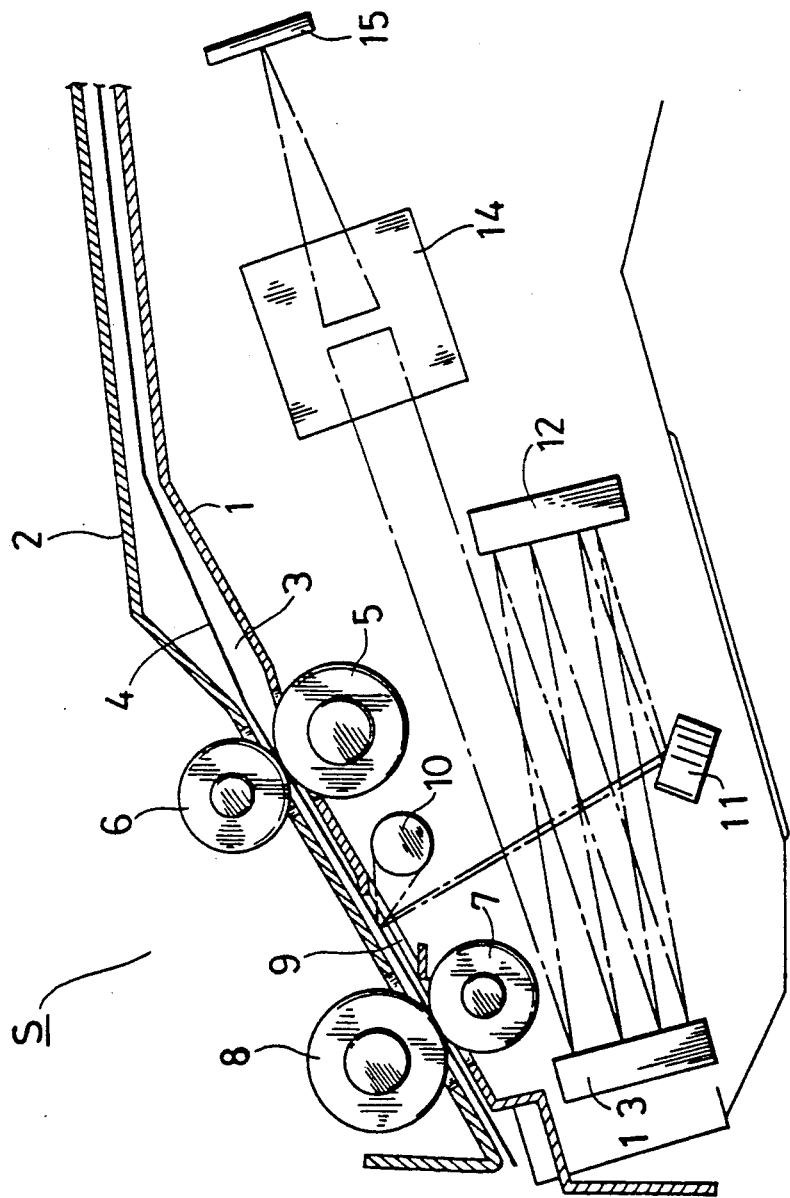
FIG. 2 is a view in vertical section showing a conventional device.

Throughout FIGS. 1 and 2, like parts are designated by like reference numerals. The document transport path 3 is defined by a lower guide plate 16 and an upper guide plate 17, which respectively have a first document contact portion 18 and a second document contact portion 19 formed by bending the guide plates to such an extent that will not be objectionable to the transport of the document 4. More specifically, the first contact portion 18 is disposed between the first transport roller 5 and the apertured document reading position 9 and is formed by bending the lower guide plate 16 at an angle α of 0.05 to 20 degrees so as to be projected into the transport path 3. The second contact portion 19 is disposed between the apertured reading position 9 and the second pinch roller 7 and is formed by bending the upper guide plate 17 at an angle β of 5 to 20 degrees so as to be projected into the path 3.

Provided upstream from the first transport roller 5 (rotatingly driven by an unillustrated motor) with respect to the transport direction are a feed roller 20, a separating rubber sheet 21 and a feed spring 22 which serve as means for sending out a stack of documents 4 one sheet after another upon separation of the documents. More specifically, the separating rubber sheet 21 is provided on the feed roller 20 and has high abrasion resistance for separating the documents 4 to deliver one sheet after another into the transport path 3. The rubber sheet 21 has one end fixed to the upper guide plate 17 and the other end in contact with the feed roller 20. The feed spring 22 is similarly attached to the upper guide plate 17 and bears on the feed roller 20 under such a spring pressure that the document 4 can be smoothly sent out over the feed roller 20.

The operation of the above embodiment will be described next. Documents 4 stacked in place are separated and sent out into the transport path 3 one by one by the feed roller 20, rubber sheet 21 and feed spring 22. The document 4 thus sent out is first nipped between the first transport roller 5 and the first pinch roller 6 and forwarded to the apertured reading position 9. The document 4 is not tensioned as in the conventional device before the leading end of the document 4 is nipped between the second pinch roller 7 and the second transport roller 8 (which is rotatingly driven by the unillustrated motor). Since data is recorded concentrically in the central portion of the document 4 with no data usually recorded on the leading end portion, no problem will arise even if the leading end portion bears some data and if the image read from this portion is somewhat inaccurate.

The second pinch roller 7 has a higher rotational speed than the first transport roller 5 which transports the document 4 at the specified speed, and the second transport roller 8 exerts a lower pinching pressure than the first pinch roller 6, so that when the leading end of the document 4 is nipped between the second pinch roller 7 and the second transport roller 8, these rollers 7, 8 slightly idle relative to the document 4 to tension the document 4 between the rollers 5 and 7, whereby the document 4 is brought into sliding contact with the contact portions 18 and 19. Between these contact portions 18, 19, therefore, the deflection of the document 4 due to the vibration of the rollers 5, 7 is absorbed by the contact portions 18, 19, with the result that the document 4 can be transported in an ideal state as tensioned and free of deflection, assuring accurate reading of the document data at the apertured reading position 9.

With the document transport device S described above and embodying the present invention, the pair of transport rollers arranged along the transport path and disposed upstream and downsteam from the apertured reading position with respect to the transport direction are made different in rotational speed as in the prior art, whereby the document being transported through the path can be tensioned between the transport rollers. Since the document is transported in sliding contact with the contact portions which are formed by bending the upper and lower guide plates and are provided at opposite sides of the reading position between the two transport rollers, the deflection of the document due to the vibration of the transport rollers can be absorbed by the contact portions. Consequently, the document is free of deflection when positioned between the contact portions and opposed to the apertured reading position, and can be transported as tensioned, assuring accurate reading of the document data. The present document transport device is available merely by modifying the shape of the upper and lower guide plates, i.e. by bending the guide plates to such an extent that is not objectionable to the transport of the document, using the same components as heretofore employed without necessitating any additional parts.

The document transport device S is provided with an optical reading assembly. This assembly comprises a light source 10 (comprising a row of light-emitting elements for scanning the document transversely thereof) for projecting light on the document 4 at the apertured reading position 9, reflecting mirrors 11, 12, 13 for deflecting the light projected by the light source and reflected from the document 4, a lens 14 for collimating the light reflected by the mirrors, and a reading device 15, such as charge-coupled device (CCD), for receiving the collimated light to read the data recorded on the document 4. The data thus read is used, for example, as drive data for the image forming unit of a facsimile system.

What is claimed is:

1. A device for transporting documents comprising:
   a document transport path including a position for optically reading the document while the document is being transported through the transport path;
   a first pair of a transport roller and a pinch roller disposed in the document transport path upstream from the reading position with respect to the direction of transport of the document;
   a second pair of a transport roller and a pinch roller disposed in the transport path downstream from the reading position with respect to the transport direction;
   said transport path including an upper guide plate and a lower guide plate spaced apart from the upper guide plate by a predetermined clearance; and
   means provided in the paper transport path at two document contact portions located respectively between the reading position and the first pair of rollers and between the reading position and the second pair of rollers for slidingly contacting the document during transport, wherein said two document contact portions are formed by bending at least one of the upper and lower guide plates at a predetermined angle into the document transport path;
   said upper guide plate being formed with one of the document contact portions angled into the document transport path in opposition to a flat section of the lower guide plate, and the lower guide plate being formed with the other document contact portion angled into the document transport path in opposition to a flat section of the upper guide plate.

2. A device as defined in claim 1 wherein the upper guide plate has one of the document contact portions between the reading position and the first pair of rollers, and the lower guide plate has the other document contact portion between the reading position and the second pair of rollers.

3. A device as defined in claim 1 wherein the two document contact portions are formed by bending one or both of the upper and lower guide plates at an angle of from 5 to 20 degrees into the document transport path.

* * * * *